United States Patent
Okubo et al.

(10) Patent No.: US 6,291,538 B1
(45) Date of Patent: Sep. 18, 2001

(54) PROCESS FOR PREPARING POLYURETHANE FOAM

(75) Inventors: Makoto Okubo; Takayuki Nomura; Kenichi Suzuki, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/422,229

(22) Filed: Oct. 21, 1999

(30) Foreign Application Priority Data

Dec. 24, 1998 (JP) .................................................. 10-366908
Feb. 4, 1999 (JP) .................................................. 11-027387
Mar. 19, 1999 (JP) .................................................. 11-076601

(51) Int. Cl.⁷ .................................................. C08G 18/00
(52) U.S. Cl. ........................... 521/128; 521/174; 521/176
(58) Field of Search ................................... 521/174, 176, 521/128

(56) References Cited

U.S. PATENT DOCUMENTS 6,040,413  *  3/2000  Fishback et al. ...................... 528/44

* cited by examiner

Primary Examiner—Rachel Gorr
Assistant Examiner—Melanie D. Bagwell
(74) Attorney, Agent, or Firm—Birch, Stewart, Kolasch & Birch, LLP

(57) ABSTRACT

A process for preparing a polyurethane foam comprising, reacting a polyol composition comprising a polyol component containing a polyoxypropylene-based polyol having an unsaturation degree of not more than 0.06 meq/g, a catalyst and water with a polyisocyanate compound. The polyurethane foam can be suitably used as shoe soles and the like.

10 Claims, No Drawings

PROCESS FOR PREPARING POLYURETHANE FOAM

BACKGROUND OF THE INVENTION

1. Field of the Invention

The present invention relates to a process for preparing a polyurethane foam. More specifically, the present invention relates to a process for preparing a polyurethane foam which can be suitably used as shoe soles and the like.

2. Discussion of the Related Art

Polyether-based polyurethanes have been employed in soles of men's shoes which would be used for a long period of time since the polyether-based polyurethanes are excellent in hydrolysis resistance as compared with polyester-based polyurethanes. However, the polyether-based polyurethanes are poor in mechanical characteristics such as abrasion resistance and flexing properties at ambient temperature.

To improve the mechanical characteristics of the polyether-based polyurethanes, it has been proposed to replace all or a part of polyoxypropylene-based polyols with polyoxytetramethylene glycol as a polyol component. In general, however, it is difficult to apply a sole made of a polyether-based polyurethane, particularly a sole having a low density to practical uses since the strength of the soles is generally insufficient not only in its foaming process but also as a final product.

Japanese Patent Laid-Open No. Sho 61-268716 discloses a process for preparing an inflexible polyurethane foam excellent in air-permeation properties and dimensional stability, wherein a low-molecular weight polyol and a high molecular weight polyol are used in combination, and not less than 1 part by weight of urea and not less than 2 parts by weight of water are simultaneously used based on 100 parts by weight of the polyols. However, this document does not disclose or suggest the use of a specific amount of urea to improve the strength of a polyurethane foam.

Japanese Unexamined Patent Publication No. Hei 4-502926 discloses that an alkoxylated polyol containing urea in a content of about 5 to about 15% by weight is used in the production of an improved flame-retardant polyurethane foam, wherein the alkoxylated polyol is prepared by subjecting an urea-dissolved mixture obtained by dissolving urea in the mixture of a polyether-polyol or a polyester-polyol with a sugar such as sucrose or lactose to alkoxylation using an alkylene oxide. However, in the alkoxylated polyol, a relatively large amount of urea is used. Also, this document does not disclose or suggest the use of urea in a specific amount to improve the strength of a polyurethane foam.

An object of the present invention is to provide a process for preparing a polyurethane foam having a high strength in spite of having a low density, and is excellent in demolding properties.

Another object of the present invention is to provide a process for preparing a polyurethane foam which can be suitably used as shoe soles.

These and other objects of the present invention will be apparent from the following description.

SUMMARY OF THE INVENTION

In accordance with the present invention, there is provided a process for preparing a polyurethane foam, comprising the step of:

reacting a polyol composition comprising a polyol component containing a polyoxypropylene polyol having an unsaturation degree of not more than 0.06 meq/g (hereinafter referred to as PPG), a catalyst and water with a polyisocyanate compound.

DETAILED DESCRIPTION OF THE INVENTION

In the present invention, there is one of great characteristics in that the PPG having an unsaturation degree of not more than 0.06 meq/g is contained in the polyol component. Accordingly, there can be provided a polyurethane foam having high strength such as foam strength and core strength.

The PPG has many oxypropylene recurring units. Accordingly, the PPG effectively acts as a soft segment in a polyurethane foam obtained, and also imparts excellent elongation properties and flexing properties to the polyurethane foam. The molecular weight of the PPG per its hydroxyl group is preferably 1,500 to 20,000, and more preferably 1,800 to 10,000 in order to give sufficient elasticity as a soft segment of the oxypropylene chain and improve its handling.

The PPG can be prepared from a compound having not less than two active hydrogen atoms as a starting material by a process which comprises carrying out a usual ring-opening addition reaction of an alkylene oxide to the above compound, and adding ethylene oxide to the resulting compound at its terminal in a block copolymerization way, and the like.

The compounds having two hydroxyl groups include glycols, phenols having two hydroxyl groups, amines having two hydroxyl groups, alkanolamines having two hydroxyl groups, and the like. The specific examples include alkylene glycols having 2 to 9 carbon atoms such as ethylene glycol, diethylene glycol, propylene glycol, dipropylene glycol, neopentyl glycol, 1,4-butanediol, 1,5-pentanediol, 1,6-hexanediol, and 1,9-nonanediol; aromatic glycols such as xylylene glycol, hydroquinone and bisphenol A; diethanolamine; dimethylol urea; and modified compounds thereof. These can be used alone or in admixture thereof.

The compounds having not less than three hydroxyl groups include polyhydric alcohols having not less than three hydroxyl groups, polyphenols having not less than three hydroxyl groups, and the like. The specific examples include glycerol, trimethylolpropane, pentaerythritol, sucrose and triethanolamine, and the like. Among them, glycerol and trimethylolpropane are preferred, and also those which give a PPG having a hydroxyl value of 10 to 300 are preferred.

The alkylene oxide which is added to the compound having two hydroxyl groups and the compound having not less than three hydroxyl groups by ring-opening addition reaction includes ethylene oxide, propylene oxide, 1,2-butylene oxide, 2,3-butylene oxide, styrene oxide, and the like. Among them, it is desirable that propylene oxide is employed alone or used together with the other alkylene oxide so that the propylene oxide can be a main component (the content of which being not less than 50% by weight, preferably not less than 65% by weight, and particularly preferably not less than 80% by weight) to give a random copolymer or a block copolymer of the propylene oxide and the other alkylene oxide, preferably the block copolymer.

It is preferable to use the PPG in which a compound having two hydroxyl groups has been used as a starting material (hereinafter referred to as PPG-A), since there can be obtained a polyurethane foam being excellent in abrasion resistance and flexibility as well as having high strength such as foam strength.

The content of the PPG-A in the polyol component is preferably 50 to 100% by weight, more preferably 80 to 100% by weight, and particularly preferably 90 to 100% by weight from the viewpoint of obtaining an inexpensive polyurethane foam being excellent in strength, flexibility, and abrasion resistance.

Further, it is preferable that (A) the PPG-A having an unsaturation degree of not more than 0.06 meq/g, in which a compound having two hydroxyl groups has been used as a starting material is used alone or together with (B) a polyoxypropylene-polyol B in which a compound having not less than three hydroxyl groups has been used as a starting material (hereinafter referred to as PPG-B) as the PPG within the weight ratio (PPG-A/PPG-B) of not less than 4. When the PPG-A and the PPG-B are used in combination, there are imparted to a foam, high strength such as foam strength, high abrasion resistance and high flexibility, and excellent appearance on the basis of the use of the PPG-A, and excellent dimensional stability and excellent solvent resistance on the basis of the use of the PPG-B. The polyol component contained in a polyol composition means a compound having a high molecular weight, which forms a soft segment in a urethane foam.

The PPG-A and the PPG-B have many oxypropylene recurring units, respectively. Accordingly, they effectively act as soft segments in a polyurethane foam obtained, and also impart excellent elongation properties and high elasticity to the polyurethane foam. Each molecular weight of the PPG-A and the PPG-B per hydroxyl group is preferably 1,500 to 20,000, and more preferably 1,800 to 10,000, respectively in order to give sufficient elasticity as a soft segment of the oxypropylene chain and improve their handling.

The PPG-A can be prepared from a compound having two hydroxyl groups as a starting material by a method which comprises carrying out a ring-opening addition reaction of an alkylene oxide, the essential component of which is propylene oxide to the above compound in the presence of a catalyst such as diethylzinc, iron chloride or a metallic porphyrin in a random polymerization way or a block polymerization way, preferably in a block polymerization way, and adding an alkylene oxide to the terminal of the resulting compound having two hydroxyl groups in a random polymerization way or a block polymerization way, preferably adding ethylene oxide to the terminal of the resulting compound in a block polymerization way, and the like. The PPG-B can be prepared from a compound having not less than three hydroxyl groups as a starting material by a method which comprises carrying out a ring-opening addition reaction of an alkylene oxide, the essential component of which is propylene oxide to the above compound in the presence of a catalyst described above or an alkaline catalyst such as potassium hydroxide or sodium hydroxide in a random polymerization way or a block polymerization way, preferably in a block polymerization way, and adding an alkylene oxide to the terminal of the resulting compound having not less than three hydroxyl groups in a random polymerization way or a block polymerization way, preferably adding ethylene oxide to the terminal of the resulting compound in a block polymerization way, and the like.

The higher the content of the oxyethylene groups existing in the PPG-A and the PPG-B and at their terminals is, hydrolysis resistance which is one of characteristics of the polyether-based polylurethane foam is lowered since the hydrophilic properties of the polyurethane foam are lowered, and thereby water is attracted to the polyurethane foam. Accordingly, it is desirable that the content of the oxyethylene groups in each of the PPG-A and the PPG-B is not more than 35% by weight, preferably not more than 20% by weight. Also, the content of the oxyethylene group in each of the PPG-A and the PPG-B is desirably not less than 5% by weight, preferably not less than 8% by weight from the viewpoint of the reactivity of the terminal groups. Each of the PPG-A and PPG-B can be used together with a polyoxyalkylene polyol, so far as the molecular weight of the total polyether-polyol per its hydroxyl group and the content of the oxyethylene group are within the above specified ranges.

It is preferable that the unsaturation degree (determined in accordance with ASTM D2849-69) of the PPG-A is not more than 0.06 meq/g, and preferably not more than 0.03 meq/g from the viewpoint of achievement of a high molecular weight. Also, the unsaturation degree of the PPG-A is preferably more than 0.015 meq/g from the viewpoint of its economics. The unsaturation degree of the PPG-B is not more than 0.20 meq/g, and preferably not more than 0.10 meq/g from the viewpoint of obtaining a polyurethane foam having a high molecular weight. Also, the unsaturation degree of the PPG-B is preferably more than 0.015 meq/g from the viewpoint of its economics.

The greater the weight ratio of PPG-A to PPG-B (PPG-A/PPG-B) is, it tends to lower the dimensional stability and solvent resistance. Also, the smaller the weight ratio of PPG-A/PPG-B is, it tends to lower flexibility and abrasion resistance. Accordingly, the weight ratio of PPG-A/PPG-B is preferably 4 to 100, more preferably 6 to 60, further more preferably 8 to 40, and particularly preferably 15 to 25.

The total amount of the PPG-A and the PPG-B in the polyol component is preferably 80 to 100% by weight, more preferably 90 to 100% by weight, and most preferably 100% by weight from the viewpoint of obtaining an inexpensive polyurethane foam having high strength.

The content of the PPG in the polyol component is preferably 15 to 100% by weight, more preferably 20 to 100% by weight, and most preferably 50 to 100% by weight from the viewpoint of improving demolding properties and obtaining an inexpensive polyurethane foam having high strength.

As the polyol component, the PPG can be used alone. The polyol component may contain a polyoxytetramethylene glycol (hereinafter referred to as PTMG) or an ε-caprolacton-modified PTMG in addition to the PPG from the viewpoint of further improving strength such as foam strength and core strength of a polyurethane foam.

The molecular weight of the PTMG is preferably 1,000 to 3,000, and more preferably 1,400 to 2,300 from the viewpoint of exhibiting sufficient elasticity as a soft segment of the oxypropylene chain and improving its handling.

In addition, as the polyol component, a polymer-polyol containing the PPG as a base material can be used. The representative examples include fine polymer particle-dispersed polymer-polyols prepared by dispersing fine polymer particles obtained by polymerizing monomers having a polymerizable unsaturated group in the PPG.

The fine polymer particle-dispersed polymer-polyols can be prepared by, for example, a method comprising mixing fine polymer particles obtained by the polymerization of monomers having a polymerizable unsaturated group with the PPG to disperse the particles in the PPG, or a method comprising polymerizing monomers having a polymerizable unsaturated group in the PPG to disperse a polymer made of the monomers in the PPG. Among these methods, the latter is preferable since a fine polymer particles uniformly dispersed polymer-polyol can be readily obtained.

The monomers having a polymerizable unsaturated group include styrene; acrylonitrile; alkyl methacrylates having an alkyl group of 1 to 4 carbon atoms such as methyl methacrylate, ethyl methacrylate and butyl methacrylate; glycidyl methacrylate; alkyl acrylates having an alkyl group of 1 to 4 carbon atoms such as methyl acrylate, ethyl acrylate and butyl acrylate; glycidyl acrylate; and the like. These monomers can be used alone or in admixture thereof.

To the polyol composition, a catalyst is added from the viewpoint of increasing reaction rate. Preferable catalysts are tertiary amines. Examples of the catalyst include 1,4-diazabicyclo-(2,2,2)-octane (hereinafter referred to as TEDA), N,N,N',N'-tetramethylhexamethylenediamine, N,N,N',N'-tetramethylpropylenediamine, N,N,N',N',N''-pentamethyldiethylenetriamine, trimethylaminoethylpiperazine, N,N-dimethylcyclohexylamine, N,N-dimethylbenzylamine, N-methylmorpholine, N-ethylmorpholine, triethylamine, tributylamine, bis(dimethylaminoalkyl)piperazine, N,N,N',N'-tetramethylethylenediamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimetylimidazol, 2-methylimidazol, and the like. These catalysts can be used alone or in admixture thereof. As a catalyst other than the tertiary amine, there can be used an organometallic compound such as dibutyltin dilaurate, stannous oleate, cobalt naphthenate or lead naphthenate. The amount of the catalyst is preferably 0.1 to 10 parts by weight, and more preferably 1 to 5 parts by weight based on 100 parts by weight of the polyol component.

Water contained in the polyol composition is used as a foaming agent. The amount of water is preferably 0.1 to 1.8 parts by weight, and more preferably 0.3 to 1.5 parts by weight based on 100 parts by weight of the polyol component.

A foaming agent such as a hydrocarbon, a chlorofluorocarbon or a hydrogenated fluorocarbon can be used together with water as occasion demands. However, it is preferable to use water alone from the viewpoint of environmental protection.

The polyol composition may contain a crosslinking agent as occasion demands. As the crosslinking agent, there can be cited, for instance, low molecular weight compounds having not less than two groups selected from the group consisting of hydroxyl group, primary amino group, secondary amino group, and the other group having active hydrogen reactive with isocyanate group. Examples of the crosslinking agent include polyhydric alcohols such as ethylene glycol, diethylene glycol, propylene glycol, dipropylene glycol, 1,4-butanediol, 1,6-hexanediol, neopentyl glycol, glycerol, trimethylolpropane, triethanolamine, and an addition product of an alkylene oxide to bisphenol A; and polyamines such as diethyltoluenediamine, chlorodiaminobenzene, ethylenediamine and 1,6-hexanediamine. The crosslinking agents can be used alone or in admixture thereof. The amount of the crosslinking agent is preferably 0.1 to 20 parts by weight, and more preferably 0.5 to 10 parts by weight based on 100 parts by weight of the polyol component.

The polyol composition may contain additives such as silicone cell regulator, pigment, antioxidant and a yellowing inhibitor in an appropriate amount as occasion demands.

As the polyisocyanate compound, there can be cited aromatic, alicyclic or aliphatic polyisocyanates having not less than two isocyanate groups, mixtures thereof, modified polyisocyanates obtained by modifying them, and the like. Examples of the polyisocyanate compound include aromatic polyisocyanates such as tolylene diisocyanate, methylenediphenyl diisocyanate, naphthylene diisocyanate, xylylene diisocyanate, polymethylenepolyphenylene diisocyanate; alicyclic polyisocyanates such as hydrogenated methylenediphenyl diisocyanate, hydrogenated tolylene diisocyanate and isophorone diisocyanate; and aliphatic polyisocyanates such as hexamethylene diisocyanate and lysine diisocyanate; mixtures thereof; modified compounds thereof, and the like. As the modified compounds, there can be cited, for instance, prepolymer-type modified compounds which are the reaction products of the isocyanate compound with a polyol, nurate-modified compounds, urea-modified compounds, carbodiimide-modified compounds, allophanate-modified compounds and buret-modified compounds. Among them, aromatic polyisocyanates and modified compounds thereof are preferred.

As the more preferred polyisocyanate compounds, there can be cited, for instance, a mixture of a modified reaction product of methylenediphenyl diisocyanate with a polyol and methylenediphenyl diisocyanate, or a mixture of the mixture mentioned above and a carbodiimide-modified compound. When a carbodiimide-modified compound is contained in the above mixture, the content of the carbodiimide-modified compound in the polyisocyanate compounds is preferably not more than 15% by weight from the viewpoint of improving flexibility. Also, it is preferable that the content of the carbodiimide-modified compound is not less than 5% by weight in consideration of the improvement of storage stability and demolding properties of a prepolymer by adding the carbodiimide-modified compound. The NCO % of the carbodiimide-modified compound is preferably 25 to 35% and more preferably 27 to 29%.

Prepolymer-type modified compounds made of a polyoxyalkylene glycol and methylenediphenyl diisocyanate and/or a modified compound thereof are effective in improving the mechanical characteristics of a polyurethane foam having a low density, since these compounds have a structure containing a soft segment of a polyoxyalkylene glycol and exhibit an appropriate viscosity, satisfactory liquidity and reactivity.

The polyoxyalkylene glycols can be prepared in the same manner as those for preparing the PPG. Among the polyoxyalkylene glycols, a polyoxypropylene-based glycol having a molecular weight of not less than 1,000 per hydroxyl group can be suitably used. This polyoxypropylene-based glycol imparts satisfactory elongation and flexibility to a polyurethane foam since the polyoxypropylene-based glycol effectively acts as a soft segment in a polyurethane foam due to its long oxyalkylene chain. The polyoxyalkylene glycol is previously reacted with a polyisocyanate. Therefore, it is not always necessary to carry out the primary hydroxylation, and ethylene oxide may be added to the terminal of the polyoxyalkylene glycol. The prepolymer-type modified compound may contain methylenediphenyl diisocyanate or a reaction product of a modified methylenediphenyl diisocyanate with a crosslinking agent.

When the polyol composition is reacted with the polyisocyanate compound, it is desirable that the ratio of the polyol component to the polyisocyanate compound is adjusted so that an isocyanate index can be 80 to 110, more preferably 90 to 110, still more preferably 95 to 105, and most preferably 99 to 101.

It is preferable that the polyol composition contains urea from the viewpoints of enabling "equivalent formation" which means that the amount of the isocyanate groups in the polyisocyanate compound is stoichiometrically equivalent to the active hydrogen atoms in the polyol compound, and improving the foam strength.

When the polyol component containing the PPG is used together with urea in a specified amount, there can be exhibited remarkable effects such as high foam strength and high core strength as well as excellent demolding properties on the basis of their mutual interaction.

Also, there has been practically used a method for producing a polyurethane foam comprising using an excess amount of a polyol such that an isocyanate index is 90 to 95 in the system using the PPG to improve productivity. When urea is added to the polyol composition employed in this method, initial strength is sufficiently imparted to a polyurethane foam. Moreover, a polyurethane foam can be formed under the condition of an isocyanate index of 100 which has been thought to give a polyurethane foam excellent final physical properties. This means that a polyurethane foam having improved initial and final physical properties can be obtained by the above method. The polyurethane foam can be suitably used as the shoe soles. This effect exhibited by the addition of urea becomes remarkable when the isocyanate index is 95 to 105.

The amount of urea is not less than 0.1 parts by weight, preferably not less than 0.2 parts by weight, and more preferably not less than 0.4 parts by weight based on 100 parts by weight of the polyol component from the viewpoint of increasing the strength of a polyurethane foam. Also, the amount of urea is not more than 0.9 parts by weight, preferably not less than 0.8 parts by weight, and more preferably not more than 0.7 parts by weight based on 100 parts by weight of the polyol component in order to avoid the wrong influence on improvement of the strength due to the addition of urea and give sufficient strength during foaming a polyurethane foam. In addition, it is desired that the polyol composition contains urea in an amount of 0.1 to 0.9 parts by weight, preferably 0.2 to 0.8 parts by weight, and more preferably 0.4 to 0.7 parts by weight based on 100 parts by weight of the polyol component in order to obtain a polyurethane foam having higher foam strength and higher abrasion resistance as well as maintain high productivity.

In general, when a polyurethane foam is prepared using the PPG, there has been practically used a method in which foaming is carried out by using an excess amount of a polyol so that the ratio of the polyol component to the polyisocyanate compound gives an isocyanate index of 90 to 95 to improve productivity.

On the other hand, according to the present invention, since urea is used in a specified amount, initial strength is sufficiently imparted to a polyurethane foam during the preparation thereof, and a polyurethane foam can be formed under the condition of an isocyanate index of 100 which has been thought to give a polyurethane foam excellent final physical properties. This means that a polyurethane foam having improved initial and final physical properties can be obtained, and such polyurethane foam can be particularly suitable for shoe soles.

The improvement of strength exhibited by the addition of urea becomes remarkable when the content of the PPG is not less than 20% by weight in the polyol component, and also the improvement becomes more remarkable when the content is not less than 50% by weight. It is noticeable from the viewpoint of economics that the decrease of the amount of the expensive PTMG and the increase of the amount of the inexpensive PPG can be accomplished by the addition of urea, in order to produce an inexpensive polyurethane foam.

The improvement of strength exhibited by the addition of urea becomes particularly remarkable when the ratio of the polyol component to the polyisocyanate compound is adjusted so that isocyanate index is 95 to 105.

As a method for preparing a polyurethane foam, there can be cited, for instance, a method comprising blending with stirring a polyol component, a catalyst, water, urea and the other additives to give a polyol composition, mixing with stirring the polyol composition with a polyisocyanate in a molding machine, pouring the resulting mixture into a mold and foaming it. More specifically, there can be cited a method comprising mixing the polyol composition with stirring in a tank, adjusting the temperature of the polyol composition to 40° C. or so, and thereafter reacting the polyol composition with a polyisocyanate compound to foam the resulting mixture in a foaming machine such as an automatic mixing and pouring-type foaming machine or an automatic mixing-type injection foaming machine.

The polyurethane foam thus obtained is excellent in foam strength, core strength and the like as well as demolding properties.

Furthermore, when the PPG in which a compound having two hydroxyl groups has been used as a starting material is employed, there can be obtained a polyurethane foam having a high strength in spite of its low density, and being excellent in abrasion resistance and flexibility.

Accordingly, the polyurethane foam can be suitably used as, for example, shoe soles and the like.

The density of a polyurethane foam formed article is 0.2 to 1.0 g/cm$^3$, preferably 0.4 to 1.0 g/cm$^3$, more preferably 0.45 to 0.8 g/cm$^3$ from the viewpoints of maintaining its physical properties and comfortableness of shoe soles. The hardness (Asker C) of a polyurethane foam formed article is 35 to 90, preferably 40 to 85, more preferably 50 to 85, still more preferably 50 to 80, and most preferably 60 to 80 from the viewpoint of giving a polyurethane foam satisfactory elasticity required for shoe soles and appropriate hardness desired for shoe soles.

EXAMPLES

Example I

A catalyst [TEDA], water, a crosslinking agent [ethylene glycol] and a cell regulator [a polyakylsiloxane manufactured by Toray Dowcorning Silicone Co., Ltd. under the trade name of "SRX253"] were prepared in the amounts as shown in Table 1 based on 100 parts by weight of a polyol component composed of the constituents as shown in Table 1, and stirred, to give a liquid polyol composition.

As the PPG, a polyoxypropylenetriol having a molecular weight of 7,000 and an unsaturation degree of 0.067 meq/g prepared by adding in order propylene oxide and ethylene oxide to a trifunctional alcohol [manufactured by Asahi Glass Urethane Co., Ltd. under the trade name of "EXCENOL 850"] (hereinafter referred to as PPG1), a polyoxypropylene glycol having a molecular weight of 4,000 and an unsaturation degree of 0.024 meq/g prepared by adding in order propylene oxide and ethylene oxide to a bifunctional alcohol [manufactured by Asahi Glass Urethane Co., Ltd. under the trade name of "PREMINOL 5005"] (hereinafter referred to as PPG2), or PTMG [polyoxytetramethylene glycol having a molecular weight of 2,000 manufactured by Hodogaya Chemical Co., Ltd. under the trade name of "PTG2000SNW"] was used.

As the polyisocyanate compound, a polyol-modified diphenylmethanediisocyanate [manufactured by Kao Corporation under the trade name of "EDDYFOAM B-6106M"; NCO %:16%] was used.

The mixing ratio of the polyol composition to the polyisocyanate compound was determined by observing the state of a free foam during the foaming reaction, and adjusted so that the isocyanate index represented by the formula:

[(actually used amount of isocyanate)/(amount of isocyanate being stoichiometrically equivalent to the polyol component)]×100 satisfies the value shown in Table 1.

The polyol composition was introduced into one tank of a pouring-type low-pressure foaming machine, and the temperature of the polyol composition was adjusted to 35° to 45° C. Also, the polyisocyanate compound was introduced into the other tank, and the temperature of the polyisocyanate compound was adjusted to 35° to 45° C.

The polyol solution was mixed with the polyisocyanate compound in the foaming machine with stirring, poured into a mold and foamed to obtain a polyurethane foam having a size of 100 mm×300 mm×10 mm.

The foam properties of the polyurethanes obtained were determined in accordance with the following methods. The results are shown in Table 1.

1. Demolding Test

A desired aluminum mold is heated to 50° C. A raw material is poured into the mold so that a formed article having a desired density can be obtained, and thereafter the mold is sealed. After 4.5 minutes passed, the mold is opened and a formed article is demolded therefrom.

In demolding, the formed article is taken out from the mold by holding the edge of the formed article in its longitudinal direction and momentarily pulling it out of the mold. The appearance of grooves on the central portion of the formed article in its longitudinal direction was observed and evaluated in accordance with the following evaluation criteria:

(Evaluation Criteria)
   ○: No defect in appearance
   Δ: Practically no problem but minor grooves being observed
   ×: Cleft being visibly observed 2. Foam Properties

[Density of Formed Article]

The density of a formed article is determined by weighing the polyurethane foam having a size of 100 mm×300 mm×10 mm, and dividing the weight by its volume, 300 cm$^3$.

[Hardness]

The hardness of a formed article is measured using an Asker C hardness meter.

[Foam Strength and Core Strength]

The foam strength of a formed article is determined by measuring the strength of a whole polyurethane foam having a thickness of 10 mm in accordance with JIS K 6251.

The core strength of a formed article is determined by measuring the strength of the core portion in accordance with JIS K 6251. The core portion was produced by slicing off a layer of 3.3 mm in thickness from each of the skin layers of the upper and lower surfaces of the polyurethane foam having a thickness of 10 mm.

TABLE 1

| | | Constituents of Polyol Composition (Parts by weight) | | | | | | | |
|---|---|---|---|---|---|---|---|---|---|
| | | Polyol Component | | | | | Crosslinking | | Isocyanate |
| Ex. No. | | PTMG | PPG1 | PPG2 | Catalyst | Water | Agent | Urea | Index |
| Ex. | I-1 | 0 | 0 | 100 | 2 | 0.7 | 6.4 | 0.5 | 100 |
| Comp. Ex. | I-1 | 0 | 0 | 100 | 2 | 0.7 | 6.4 | 0.04 | 100 |
| | I-2 | 0 | 0 | 100 | 2 | 0.7 | 6.4 | 2.0 | 100 |
| | I-3 | 0 | 0 | 100 | 2 | 0.7 | 6.4 | 0 | 90 |
| | I-4 | 0 | 100 | 0 | 2 | 0.7 | 6.4 | 0.5 | 100 |
| Ex. | I-2 | 50 | 0 | 50 | 2 | 0.7 | 6.4 | 0.5 | 100 |
| Comp. Ex. | I-5 | 50 | 0 | 50 | 2 | 0.7 | 6.4 | 0 | 110 |
| Ex. | I-3 | 80 | 0 | 20 | 2 | 0.7 | 6. 4 | 0.5 | 100 |

| | | Physical Properties of Polyurethane Foam | | | | |
|---|---|---|---|---|---|---|
| Ex. No. | | Density of Formed Article (g/cm$^3$) | Hardness (Asker C) | Demolding Test | Foam Strength (MPa) | Core Strength (MPa) |
| Ex. | I-1 | 0.5 | 60 | ○ | 3.4 | 3.2 |
| Comp. Ex. | I-1 | 0.5 | 60 | × | 3.3 | 3.2 |
| | I-2 | 0.5 | 60 | × | 3.0 | 2.9 |
| | I-3 | 0.5 | 60 | Δ | 2.8 | 2.8 |
| | I-4 | 0.5 | 60 | ○ | 3.2 | 2.6 |
| Ex. | I-2 | 0.5 | 60 | ○ | 3.7 | 3.6 |
| Comp. Ex. | I-5 | 0.5 | 60 | Δ | 3.2 | 3.4 |
| Ex. | I-3 | 0.5 | 60 | ○ | 4.2 | 4.0 |

From the results shown in Table 1, it can be seen that the polyurethane foams obtained in Examples I-1 to I-3 have no problems in appearance in practical uses and have a high foam strength and a high core strength.

From the results of the comparison of Example I-1 with Comparative Examples I-1 to I-3, it can be seen that the polyurethane foam obtained in Example I-1 is excellent in appearance and also has a high strength, while the polyurethane foams obtained in Comparative Examples I-1 to I-3 have problems in appearance or are poor in strength since their urea contents are out of the range of 0.1 to 0.9.

In addition, from the results of the comparison of Example I-1 with Comparative Example I-4, it can be seen that the polyurethane foam obtained in Example I-1 is excellent in strength, while the polyurethane foam obtained in Comparative Example I-4 is poor in strength since PPG having an unsaturation degree of more than 0.06 meq/g is used.

It can be seen that the polyurethane foam obtained in Example I-2 has no problems in appearance, and possesses a high foam strength and a high core strength.

From the results of the comparison of Example I-2 with Comparative Example I-5, it can be seen that the polyurethane foam obtained in Example I-2 is excellent in appearance and also has an high strength, while the polyurethane foam obtained in Comparative Example I-5 is poor in strength since the urea content is out of the range of 0.1 to 0.9.

Furthermore, it can be seen that the polyurethane foam obtained in Example I-2 has a higher foam strength and a higher core strength in comparison with the polyurethane foam obtained in Example I-1 since PTMG is used therein.

In addition, it can be seen that the polyurethane foam obtained in Example I-3 has no problems in appearance, and that this polyurethane foam has an even higher foam strength and higher core strength in comparison with the polyurethane foam obtained in Example I-1 since the amount of PTMG used in Example I-3 is more than that of PTMG used in Example I-1.

Example II

A catalyst [TEDA], water, a crosslinking agent [ethylene glycol] and a cell regulator [a polyakylsiloxane manufactured by Toray Dowcorning Silicone Co., Ltd. under the trade name of "SRX253"] were prepared in the amounts as shown in Table 2 based on 100 parts by weight of a polyol component composed of the constituents as shown in Table 2, and stirred, to give a liquid polyol composition.

As the PPG, a polyoxypropylene glycol having a molecular weight of 4,000 and an unsaturation degree of 0.024 meq/g prepared by adding in order propylene oxide and ethylene oxide to a bifunctional alcohol [manufactured by Asahi Glass Urethane Co., Ltd. under the trade name of "PREMINOL 5005"] (hereinafter referred to as PPG3), a polyoxypropylenetriol having a molecular weight of 7,000 and an unsaturation degree of 0.022 meq/g prepared by adding in order propylene oxide and ethylene oxide to a trifunctional alcohol [manufactured by Asahi Glass Urethane Co., Ltd. under the trade name of "PREMINOL 7005"] (hereinafter referred to as PPG4), a polyoxypropylene glycol having a molecular weight of 4,000 and an unsaturation degree of 0.087 meq/g prepared by in order adding propylene oxide and ethylene oxide to a bifunctional alcohol [manufactured by Asahi Glass Urethane Co., Ltd. under the trade name of "EXCENOL 510"] (hereinafter referred to as PPG5), and a polyoxypropylenetriol having a molecular weight of 7,000 and an unsaturation degree of 0.067 meq/g prepared by adding in order propylene oxide and ethylene oxide to a trifunctional alcohol [manufactured by Asahi Glass Urethane Co., Ltd. under the trade name of "EXCENOL 850"] (hereinafter referred to as PPG6) were used.

As the polyisocyanate compound, a polyisocyanate compound A or a polyisocyanate compound B was used.

As the polyisocynate compound A, a polyol-modified diphenylmethanediisocyanate [manufactured by Kao Corporation under the trade name of "EDDYFOAM B-6106M"; NCO %:16%] was used.

As the polyisocynate compound B, a mixture prepared by blending 100 parts by weight of a polyol-modified diphenylmethanediisocyanate [manufactured by Kao Corporation under the trade name of "EDDYFOAM B-6106M"; NCO %:16%] with 6.4 parts by weight of a modified carbodiimide [manufactured by Nippon Polyurethane Industry Co., Ltd. under the trade name of "CORONATE MX"; NCO %:16.8%].

The mixing ratio of the polyol composition to the polyisocyanate compound was determined by observing the state of a free foam during the foaming reaction, and adjusted so that the isocyanate index represented by the formula:

[(actually used amount of isocyanate)/(amount of isocyanate being stoichiometrically equivalent to the polyol component)]×100 satisfies the value shown in Table 2.

The polyol composition was introduced into one tank of a pouring-type low-pressure foaming machine, and the temperature of the polyol composition was adjusted to 35° to 45° C. Also, the polyisocyanate compound was introduced into the other tank, and the temperature of the polyisocyanate compound was adjusted to 35° to 45° C.

The polyol solution was mixed with the polyisocyanate compound in the foaming machine with stirring, poured into a mold and foamed to obtain a polyurethane foam having a size of 100 mm×300 mm×10 mm.

As the foam properties of the polyurethane foams obtained, density of formed article, hardness and foam strength were determined in the same manner as in Example I, and abrasion resistance and flexibility were determined in accordance with the following methods. The results are shown in Table 2.

[Abrasion Resistance]

The abrasion resistance of a formed article is determined in accordance with DIN 53516.

[Flexibility]

The flexibility of a formed article is determined in accordance with DIN 52243.

TABLE 2

| | Constituents of Polyol Composition (Parts by weight) | | | | | | | | | | |
|---|---|---|---|---|---|---|---|---|---|---|---|
| | Polyol Component | | | | | | | | | Crosslinking | Polyisocyanate | Isocyanate |
| Ex. No. | PTMG | PPG3 | PPG4 | PPG5 | PPG6 | Urea | Catalyst | Water | Agent | Compound | Index |
| Ex. II-1 | 0 | 100 | 0 | 0 | 0 | 0 | 2 | 0.70 | 6.4 | A | 90 |
| II-2 | 50 | 50 | 0 | 0 | 0 | 0 | 2 | 0.70 | 6.4 | A | 90 |
| II-3 | 0 | 100 | 0 | 0 | 0 | 0 | 2 | 0.78 | 6.4 | A | 90 |
| II-4 | 0 | 100 | 0 | 0 | 0 | 0 | 2 | 0.70 | 4.5 | A | 90 |
| II-5 | 0 | 100 | 0 | 0 | 0 | 0.5 | 2 | 0.70 | 6.1 | A | 100 |
| II-6 | 0 | 100 | 0 | 0 | 0 | 0 | 2 | 0.70 | 6.1 | B | 90 |
| II-7 | 0 | 100 | 0 | 0 | 0 | 0.5 | 2 | 0.70 | 5.9 | B | 100 |

TABLE 2-continued

| Comp. Ex. | | | | | | | | | | | |
|---|---|---|---|---|---|---|---|---|---|---|---|
| II-1 | 0 | 0 | 100 | 0 | 0 | 0 | 2 | 0.70 | 6.4 | A | 90 |
| II-2 | 0 | 0 | 0 | 100 | 0 | 0 | 2 | 0.70 | 6.4 | A | 90 |
| II-3 | 0 | 0 | 0 | 0 | 100 | 0 | 2 | 0.70 | 6.4 | A | 90 |
| II-4 | 0 | 0 | 0 | 0 | 100 | 0 | 2 | 0.78 | 6.6 | A | 90 |
| II-5 | 0 | 0 | 0 | 0 | 100 | 0 | 2 | 0.68 | 4.5 | A | 90 |

| | Physical Properties of Polyurethane Foam | | | | |
|---|---|---|---|---|---|
| Ex. No. | Density of Formed Article (g/cm$^3$) | Hardness (Asker C) | Foam Strength (MPa) | Abrasion Resistance (mg) | Flexibility (Growth of Crack) (mm) |
| Ex. II-1 | 0.50 | 60 | 2.8 | 126 | 0 |
| II-2 | 0.50 | 60 | 3.2 | 55 | 0 |
| II-3 | 0.45 | 60 | 2.6 | 133 | 0 |
| II-4 | 0.50 | 50 | 2.5 | 121 | 0 |
| II-5 | 0.50 | 60 | 3.1 | 69 | 0 |
| II-6 | 0.50 | 60 | 2.8 | 142 | 0 |
| II-7 | 0.50 | 60 | 3.1 | 78 | 0 |
| Comp. Ex. | | | | | |
| II-1 | 0.50 | 60 | 2.7 | 140 | 25 |
| II-2 | 0.50 | 60 | 1.9 | 177 | 5 |
| II-3 | 0.50 | 60 | 2.6 | 191 | 25 |
| II-4 | 0.45 | 60 | 2.2 | 215 | 25 |
| II-5 | 0.50 | 50 | 2.1 | 233 | 25 |

From the results shown in Table 2, it can be seen that the polyurethane foams obtained in Examples II-1 to II-4 have a higher foam strength and are more excellent in abrasion resistance and flexibility in spite of having a low density in comparison with the polyurethane foams obtained in Comparative Examples II-1 to II-5 since a PEG having an unsaturation degree of 0.06 meq/g or less, in which a compound having two hydroxyl groups is used as a starting material, is employed.

Example III

A catalyst [TEDA], water, a crosslinking agent [ethylene glycol] and a cell regulator [a polyakylsiloxane manufactured by Toray Dowcorning Silicone Co., Ltd. under the trade name of "SRX253"] were prepared in the amounts as shown in Table 3 based on 100 parts by weight of a polyol component composed of the constituents as shown in Table 3, and stirred, to give a liquid polyol composition.

As the PPG, a polyoxypropylene glycol having a molecular weight of 4,000 and an unsaturation degree of 0.024 meq/g prepared by adding in order propylene oxide and ethylene oxide to a bifunctional alcohol [manufactured by Asahi Glass Urethane Co., Ltd. under the trade name of "PREMINOL 5005"] (hereinafter referred to as PPG7), a polyoxypropylenetriol having a molecular weight of 7,000 and an unsaturation degree of 0.022 meq/g prepared by adding in order propylene oxide and ethylene oxide to a trifunctional alcohol [manufactured by Asahi Glass Urethane Co., Ltd. under the trade name of "PREMINOL 7005"] (hereinafter referred to as PPG8), a polyoxypropylenetriol having a molecular weight of 7,000 and an unsaturation degree of 0.067 meq/g prepared by adding in order propylene oxide and ethylene oxide to a trifunctional alcohol [manufactured by Asahi Glass Urethane Co., Ltd. under the trade name of "EXCENOL 850"] (hereinafter referred to as PPG9), and a polyoxypropylene glycol having a molecular weight of 4,000 and an unsaturation degree of 0.087 meq/g prepared by adding in order propylene oxide and ethylene oxide to a bifunctional alcohol [manufactured by Asahi Glass Urethane Co., Ltd. under the trade name of "EXCENOL 510"] (hereinafter referred to as PPG10) were used.

As the polyisocyanate compound, a polyol-modified diphenylmethanediisocyanate [manufactured by Kao Corporation under the trade name of "EDDYFOAM B-6106M"; NCO %:16%] was used.

The mixing ratio of the polyol composition to the polyisocyanate compound was determined by observing the state of a free foam during the foaming reaction, and adjusted so that the isocyanate index represented by the formula:

[(actually used amount of isocyanate)/(amount of isocyanate being stoichiometrically equivalent to the polyol component)]×100 satisfies the value shown in Table 3.

The polyol composition was introduced into one tank of a pouring-type low-pressure foaming machine, and the temperature of the polyol composition was adjusted to 35° to 45° C. Also, the polyisocyanate compound was introduced into the other tank, and the temperature of the polyisocyanate compound was adjusted to 35° to 45° C.

The polyol solution was mixed with the polyisocyanate compound in the foaming machine with stirring, poured into an iron mold set at 45° C. and foamed to obtain a polyurethane foam having a size of 100 mm×300 mm×10 mm.

As the foam properties of the polyurethane foams obtained, density of formed article, hardness and foam strength were determined in the same manner as in Example I, abrasion resistance and flexibility were determined in the same manner as in Example II, and dimensional change, solvent resistance and appearance were determined in accordance with the following methods. The results are shown in Table 3.

[Dimensional Change]

A raw material is poured into an iron mold having an internal dimension of 100 mm×300 mm×10 mm so that the density of a formed article satisfies the value shown in Table 3. After 7 minutes passed from the time when the raw material is poured into a mold, demolding is carried out and the formed article obtained is allowed to stand at room temperature for one day, and thereafter the dimensional change of the polyurethane foam in its longitudinal direction is determined.

[Solvent Resistance]

After forming, the formed article obtained is allowed to stand at room temperature for one day. The formed article is subjected to the test of the above-mentioned "5. Dimensional Change", the polyurethane foam is folded in two, and the folded portion of the polyurethane foam is immersed in trichloroethylene for 15 seconds and then taken out from trichloroethylene. The presence of cracks is visually observed and evaluated in accordance with the following evaluation criteria:
(Evaluation Criteria)
 ○: No crack is observed.
 ×: Crack is observed.

[Appearance]

A formed article sheet having a size of 100 mm×300 mm×10 mm is allowed to stand at room temperature for one day, and thereafter immersed in trichloroethylene having room temperature for 10 seconds, and air-dried at room temperature. The gloss of the surface of the sheet after having been allowed to stand for one day is visually observed and evaluated in accordance with the following evaluation criteria:
(Evaluation Criteria)
 ○: Excellent in gloss
 ×: Poor in gloss

TABLE 3

| | Constituents of Polyol Composition (Parts by weight) | | | | | | | | Weight Ratio of | |
|---|---|---|---|---|---|---|---|---|---|---|
| | Polyol Component | | | | | | | | | |
| | PPG-A | PPG-B | Third component | | | | | Crosslinking | PPG-A/ | Isocyanate |
| Ex. No. | PPG7 | PPG8 | PPG9 | PPG10 | PTMG | Catalyst | Water | Agent | Urea | PPG-B | Index |
| Ex. | | | | | | | | | | | |
| III-1 | 85 | 0 | 15 | 0 | 0 | 2 | 0.70 | 6.4 | 0 | 5.7 | 95 |
| III-2 | 90 | 0 | 10 | 0 | 0 | 2 | 0.70 | 6.4 | 0 | 9 | 95 |
| III-3 | 95 | 0 | 5 | 0 | 0 | 2 | 0.70 | 6.4 | 0 | 19 | 95 |
| III-4 | 97.5 | 0 | 2.5 | 0 | 0 | 2 | 0.70 | 6.4 | 0 | 39 | 95 |
| III-5 | 95 | 5 | 0 | 0 | 0 | 2 | 0.70 | 6.4 | 0 | 19 | 95 |
| III-6 | 75 | 0 | 5 | 0 | 20 | 2 | 0.70 | 6.4 | 0 | 15 | 95 |
| III-7 | 95 | 0 | 5 | 0 | 0 | 2 | 0.70 | 6.4 | 0.5 | 19 | 100 |
| III-8 | 90 | 0 | 10 | 0 | 0 | 2 | 0.70 | 6.4 | 0.5 | 9 | 100 |
| III-9 | 95 | 0 | 5 | 0 | 0 | 2 | 0.65 | 6.4 | 0 | 19 | 95 |
| III-10 | 95 | 0 | 5 | 0 | 0 | 2 | 0.78 | 6.4 | 0 | 19 | 95 |
| Comp. Ex. | | | | | | | | | | | |
| III-1 | 100 | 0 | 0 | 0 | 0 | 2 | 0.70 | 6.4 | 0 | ∞ | 95 |
| III-2 | 75 | 0 | 25 | 0 | 0 | 2 | 0.70 | 6.4 | 0 | 3 | 95 |
| III-3 | 75 | 25 | 0 | 0 | 0 | 2 | 0.70 | 6.4 | 0 | 3 | 95 |
| III-4 | 0 | 0 | 0 | 100 | 0 | 2 | 0.70 | 6.4 | 0 | — | 95 |
| II1-5 | 75 | 0 | 25 | 0 | 0 | 2 | 0.65 | 6.4 | 0 | 3 | 95 |
| III-6 | 75 | 0 | 25 | 0 | 0 | 2 | 0.78 | 6.4 | 0 | 0 | 95 |
| III-7 | 0 | 0 | 100 | 0 | 0 | 2 | 0.70 | 0.64 | 0 | 0 | 95 |

| | Physical Properties of Polyurethane Foam | | | | | | |
|---|---|---|---|---|---|---|---|
| Ex. No. | Density of Formed Artcle (g/cm³) | Hardness (Asker C) | Foam Strength (MPa) | Flexibility (Growth of Crack) (mm) | Dimensional Change (mm) | Solvent Resistance | Appearance |
| Ex. | | | | | | | |
| III-1 | 0.5 | 61 | 3.2 | 0 | 0 | ○ | ○ |
| III-2 | 0.5 | 60 | 3.2 | 0 | 0.5 | ○ | ○ |
| III-3 | 0.5 | 60 | 3.1 | 0 | 0 | ○ | ○ |
| III-4 | 0.5 | 60 | 3.1 | 0 | 0.5 | ○ | ○ |
| III-5 | 0.5 | 60 | 3.1 | 0 | 0.5 | ○ | ○ |
| III-6 | 0.5 | 60 | 3.5 | 0 | 0 | ○ | ○ |
| III-7 | 0.5 | 60 | 3.5 | 0 | 0.5 | ○ | ○ |
| III-8 | 0.5 | 61 | 3.6 | 0 | 0 | ○ | ○ |
| III-9 | 0.65 | 72 | 3.8 | 0 | −0.5 | ○ | ○ |
| III-10 | 0.45 | 56 | 2.4 | 0 | 0.5 | ○ | ○ |
| Comp. Ex. | | | | | | | |
| III-1 | 0.5 | 60 | 3.0 | 0 | 3.5 | X | X |
| III-2 | 0.5 | 60 | 3.2 | 2 | 0 | ○ | ○ |
| III-3 | 0.5 | 61 | 3.2 | 6 | 0 | ○ | ○ |
| III-4 | 0.5 | 60 | Not Determinable | — | 8.5 | X | X |
| III-5 | 0.65 | 72 | 3.7 | 12 | −1 | ○ | ○ |
| III-6 | 0.45 | 57 | 2.4 | 2 | −1 | ○ | ○ |
| III-7 | 0.5 | 60 | 2.7 | 12 | −1 | ○ | X |

From the results shown in Table 3, it can be seen that the polyurethane foams obtained in Examples III-1 to III-10 have a higher foam strength and are more excellent in flexibility, dimensional stability, solvent resistance and appearance, in comparison with the polyurethane foams obtained in Comparative Examples III-1 to III-7.

Example IV

The compounds shown in Tables 4 to 6 were used as the polyether-polyol or the polymer-polyol, and mixed in the amounts as shown in Tables 4 to 6. The amount of each compound was shown by "parts by weight" on the basis of 100 parts by weight of the total amount of the polyol component.

A predetermined amount of ethylene glycol as a crosslinking agent, a predetermined amount of polyalkylsiloxane as a cell regulator [manufactured by Toray Dowcorning Silicone Co., Ltd. under the trade name of "SRX253"], a predetermined amount of TEDA [1,4-diazabicyclo-(2,2,2)-octane] as a catalyst, a predetermined amount of water and a predetermined amount of urea were added to 100 parts by weight of the polyol component with stirring, to give a polyol solution containing the polyol component. The appearance of the polyol solution was a pale yellow opaque liquid at 25° C. and the polyol solution was separated into two phases in accordance with the passage of time.

As the polyisocyanate compound, a polyol-modified diphenylmethane diisocyanate [manufactured by Kao Corporation under the trade name of "EDDYFOAM B-6106M"; NCO %:16%] was used.

The mixing ratio of the polyol solution to the polyisocyanate compound was determined by observing the state of a free foam during the foaming reaction, and the isocyanate index represented by the formula:

[(actually used amount of isocyanate)/(amount of isocyanate being stoichiometrically equivalent to the polyol component)]×100 was 90 to 110 or so. The amount of each polyisocyanate compound shown in Tables 4 to 6 is revealed by "parts by weight" on the basis of 100 parts by weight of the polyol solution.

The polyol solution composed of the constituents as shown in Tables 4 to 6 was introduced into one tank of a pouring-type low-pressure foaming machine, and the temperature of the polyol solution was adjusted to 35° to 45° C. Also, the polyisocyanate compound was introduced into the other tank, and the temperature of the polyisocyanate compound was adjusted to 35° to 45° C.

The polyol solution was mixed with the polyisocyanate compound in the foaming machine with stirring, poured into a mold and foamed to obtain a polyurethane foam having a size of 100 mm×300 mm×10 mm.

As the physical properties of the polyurethane foams obtained, foam properties and strength were determined in the same manner as in Example I, demolding test was carried out, and initial tensile strength and initial elongation, tensile strength, and elongation were determined in accordance with the following methods. The results are shown in Tables 4 to 6.

The meanings of abbreviations for the polyol components used in the respective Examples and Comparative Examples are as follows:

[Polyether-polyol]
<PPG> polyether-polyol I: polyoxypropylenetriol having a terminal polyoxyethylene and a molecular weight of 7,000, prepared by adding in order propylene oxide and ethylene oxide to a trifunctional alcohol [manufactured by Asahi Orlin Co., Ltd. (Asahi Glass Urethane Co., Ltd., at present) under the trade name of "EXCENOL 850"]

<PTMG> polyether-polyol II: polyoxytetramethylene glycol having a molecular weight of 2,000 [manufactured by Hodogaya Chemical Co., Ltd. under the trade name of "PTG2000SNW"]

[Polymer-polyol]

Polymer-polyol I: polyol comprising fine particles prepared by the polymerization of acrylonitrile and styrene in a polyoxypropylenetriol having a terminal polyoxyethylene, prepared by adding in order propylene oxide and ethylene oxide to a trifunctional alcohol [manufactured by Asahi Orlin Co., Ltd. (Asahi Glass Urethane Co., Ltd., at present) under the trade name of "EXCENOL 941"]

[Demolding Test]

A desired aluminum mold is heated to 50° C. A raw material is poured into a mold so that a formed article having a desired density can be obtained, and thereafter the mold is sealed. After a predetermined time (4.5 or 6.5 minutes) passed, the mold is opened and a formed article is demolded. In demolding, the formed article is taken out from the mold by holding the edge of the formed article in its longitudinal direction and momentarily pulling it out of the mold. The appearance of grooves on the central portion of the formed article in its longitudinal direction was observed and evaluated in accordance with the following evaluation criteria:

(Evaluation Criteria)

⊚: No defect in appearance

Δ: Practically no problem but minor grooves being observed

×: Cleft being visibly observed

[Initial Tensile Strength and Initial Elongation]

A raw material is poured into a mold set at 50° C., and after 5 minutes passed from the pouring, a formed article is demolded from the mold. The formed article is stamped out using a dumbbell to give a sample, and the initial tensile strength and initial elongation of the sample were determined in accordance with JIS K 6301 after 7 minutes passed from the time when the raw material is poured into a mold.

[Tensile Strength]

The tensile strength of a formed article is determined in accordance with JIS K 6301.

[Elongation]

The elongation of a formed article is determined in accordance with JIS K 6301.

TABLE 4

Polyol Solution (Parts by weight)

| Ex. No. | Polyether-Polyol 1 | Polyether-Polyol 2 | Polymer-Polyol 1 | Crosslinking Agent | Cell Regulator | Catalyst | Water | Urea | Polyisocyanate Compound | Isocyanate Index |
|---|---|---|---|---|---|---|---|---|---|---|
| IV-1 | 100 | 0 | 0 | 8.3 | 1.0 | 1.5 | 0.45 | 0.1 | 93 | 100 |
| IV-2 | 100 | 0 | 0 | 8.3 | 1.0 | 1.5 | 0.45 | 0.6 | 83 | 90 |
| IV-3 | 100 | 0 | 0 | 8.3 | 1.0 | 1.5 | 0.45 | 0.6 | 88 | 95 |
| IV-4 | 100 | 0 | 0 | 8.3 | 1.0 | 1.5 | 0.45 | 0.6 | 93 | 100 |
| IV-5 | 100 | 0 | 0 | 8.3 | 1.0 | 1.5 | 0.45 | 0.6 | 97 | 105 |
| IV-6 | 100 | 0 | 0 | 8.3 | 1.0 | 1.5 | 0.45 | 0.6 | 102 | 110 |
| IV-7 | 100 | 0 | 0 | 8.3 | 1.0 | 1.5 | 0.45 | 0.9 | 93 | 100 |

Physical Properties of Polyurethane Foam

| Ex. No. | Demolding Test (4.5 min) | Demolding Test (6.0 min) | Density of Foamed Article (g/cm$^3$) | Hardness (Asker C) | Initial Tensile Strength (MPa) | Initial Elongation (%) | Tensile Strength (MPa) | Elongation (%) |
|---|---|---|---|---|---|---|---|---|
| IV-1 | ⊙ | — | 0.6 | 79 | 1.32 | 380 | 4.28 | 400 |
| IV-2 | ⊙ | — | 0.6 | 79 | 2.45 | 420 | 3.91 | 480 |
| IV-3 | ⊙ | — | 0.6 | 79 | 1.90 | 400 | 4.12 | 420 |
| IV-4 | ⊙ | — | 0.6 | 79 | 1.53 | 370 | 4.45 | 400 |
| IV-5 | ⊙ | — | 0.6 | 79 | 1.05 | 330 | 4.38 | 400 |
| IV-6 | ○ | — | 0.6 | 80 | 0.51 | 200 | 2.94 | 300 |
| IV-7 | ○ | — | 0.6 | 80 | 1.20 | 200 | 3.76 | 400 |

TABLE 5

Polyol Solution (Parts by weight)

| Comp. Ex. No. | Polyether-Polyol 1 | Polyether-Polyol 2 | Polymer-Polyol 1 | Crosslinking Agent | Cell Regulator | Catalyst | Water | Urea | Polyisocyanate Compound | Isocyanate Index |
|---|---|---|---|---|---|---|---|---|---|---|
| IV-1 | 100 | 0 | 0 | 8.3 | 1.0 | 1.5 | 0.45 | 0.04 | 83 | 90 |
| IV-2 | 100 | 0 | 0 | 8.3 | 1.0 | 1.5 | 0.45 | 0.04 | 93 | 100 |
| IV-3 | 100 | 0 | 0 | 8.3 | 1.0 | 1.5 | 0.45 | 0.04 | 102 | 110 |
| IV-4 | 100 | 0 | 0 | 8.3 | 1.0 | 1.5 | 0.45 | 2.0 | 83 | 90 |
| IV-5 | 100 | 0 | 0 | 8.3 | 1.0 | 1.5 | 0.45 | 2.0 | 93 | 100 |
| IV-6 | 100 | 0 | 0 | 8.3 | 1.0 | 1.5 | 0.45 | 2.0 | 102 | 110 |
| IV-7 | 100 | 0 | 0 | 8.3 | 0 | 1.5 | 0 | 0.04 | 82 | 100 |
| IV-8 | 100 | 0 | 0 | 8.3 | 0 | 1.5 | 0 | 0.6 | 82 | 100 |

Physical Properties of Polyurethane Foam

| Comp. Ex. No. | Demolding Test (4.5 min) | Demolding Test (6.0 min) | Density of Foamed Article (g/cm$^3$) | Hardness (Asker C) | Initial Tensile Strength (MPa) | Initial Elongation (%) | Tensile Strength MPa | Elongation (%) |
|---|---|---|---|---|---|---|---|---|
| IV-1 | ⊙ | — | 0.6 | 80 | 2.02 | 380 | 3.92 | 480 |
| IV-2 | X | — | 0.6 | 80 | 0.95 | 380 | 4.36 | 400 |
| IV-3 | X | — | 0.6 | 81 | 0.40 | 200 | 2.89 | 300 |
| IV-4 | ⊙ | — | 0.6 | 80 | 1.39 | 220 | 3.76 | 400 |
| IV-5 | X | — | 0.6 | 80 | 1.20 | 200 | 3.75 | 390 |
| IV-6 | X | — | 0.6 | 81 | 0.49 | 90 | 2.46 | 200 |
| IV-7 | ○ | — | 1.1 | 92 | 6.82 | 550 | 10.30 | 600 |
| IV-8 | ○ | — | 1.1 | 92 | 6.92 | 550 | 10.20 | 600 |

TABLE 6

Polyol Solution (Parts by weight)

| Ex. No | | Polyether-Polyol 1 | Polyether-Polyol 2 | Polymer-Polyol 1 | Crosslinking Agent | Cell Regulator | Catalyst | Water | Urea | Polyisocyanate Compound | Isocyanate Index |
|---|---|---|---|---|---|---|---|---|---|---|---|
| EX. | IV-8 | 80 | 20 | 0 | 8.5 | 1.0 | 1.5 | 0.6 | 0.6 | 101 | 100 |
| Comp. Ex. | IV-9 | 80 | 20 | 0 | 8.5 | 1.0 | 1.5 | 0.6 | 0.04 | 101 | 100 |
| Ex. | IV-9 | 50 | 50 | 0 | 8.6 | 1.0 | 1.5 | 0.65 | 0.6 | 106 | 100 |
| Comp. Ex. | IV-10 | 50 | 50 | 0 | 8.6 | 1.0 | 1.5 | 0.65 | 0.04 | 106 | 100 |

TABLE 6-continued

| Ex. | IV-10 | 0 | 100 | 0 | 8.6 | 1.0 | 1.5 | 0.68 | 0.6 | 114 | 100 |
|---|---|---|---|---|---|---|---|---|---|---|---|
| Comp. Ex. | IV-11 | 0 | 100 | 0 | 8.6 | 1.0 | 1.5 | 0.68 | 0.04 | 114 | 100 |
| Ex. | IV-11 | 0 | 50 | 50 | 4.5 | 0 | 1.2 | 1.2 | 0.6 | 85 | 90 |
| Comp. Ex. | IV-12 | 0 | 50 | 50 | 4.5 | 0 | 1.2 | 1.2 | 0.6 | 94 | 100 |
| Ex. | IV-12 | 0 | 50 | 50 | 4.5 | 0 | 1.2 | 1.2 | 0.04 | 85 | 90 |
| Comp. Ex. | IV-13 | 0 | 50 | 50 | 4.5 | 0 | 1.2 | 1.2 | 0.04 | 94 | 100 |

| | | Physical Properties of Polyurethane Foam | | | | | | | |
|---|---|---|---|---|---|---|---|---|---|
| Ex. No. | | Demolding Test (4.5 min) | Demolding Test (6.0 min) | Density of Formed Article (g/cm$^3$) | Hardness (Asker C) | Initial Tensile Strength (MPa) | Initial Elongation (%) | Tensile Strength (MPa) | Elongation (%) |
| EX. | IV-8 | ⊚ | — | 0.6 | 80 | 2.99 | 450 | 4.75 | 420 |
| Comp. Ex. | IV-9 | ⊚ | — | 0.6 | 80 | 2.36 | 420 | 4.34 | 390 |
| Ex. | IV-9 | ⊚ | — | 0.6 | 80 | 3.05 | 420 | 4.89 | 450 |
| Comp. Ex. | IV-10 | ⊚ | — | 0.6 | 80 | 2.40 | 420 | 4.30 | 460 |
| Ex. | IV-10 | ⊚ | — | 0.6 | 80 | 3.83 | 470 | 5.25 | 480 |
| Comp. Ex. | IV-11 | ⊚ | — | 0.6 | 80 | 3.19 | 460 | 5.00 | 480 |
| Ex. | IV-11 | — | ⊚ | 0.3 | 72 | 1.33 | 320 | 2.50 | 310 |
| Comp. Ex. | IV-12 | — | ⊚ | 0.3 | 72 | 0.78 | 200 | 2.88 | 260 |
| Ex. | IV-12 | — | ⊚ | 0.3 | 68 | 0.76 | 200 | 2.38 | 290 |
| Comp. Ex. | IV-13 | — | X | 0.3 | 69 | 0.46 | 110 | 2.97 | 290 |

In the demolding test, from the results shown in Tables 4 to 6, it can be seen that the polyurethane foams obtained in Examples IV-1 to IV-12 have no problem in appearance as a formed article in practical uses since urea is added to the polyol component in an amount of 0.1 to 0.9 parts by weight based on 100 parts by weight of the polyol component, and that the effect of the addition of urea becomes greater when the amount of urea used is 0.1 to 0.6 parts by weight based on 100 parts by wight of the polyol components.

The polyurethane foams obtained in Comparative Examples IV-2, IV-3, IV-5, IV-6 and IV-13 have a serious disadvantage that the polyurethane foams cannot be demolded from a mold since the amount of urea used in these polyurethane foams is out of the above range differing from in Examples IV-1 to 7. In addition, from the results of the comparison of Examples IV-2 to IV-6 with Comparative Examples IV-1 to IV-3 and IV-4 to IV-6, the initial tensile strength is remarkably increased due to the addition of urea in an amount specified above. On the other hand, the results of the comparison of Examples IV-2 to IV-6 with Comparative Examples IV-4 to IV-6 show that the addition of urea in an amount exceeding the range specified above leads to the lowering of tensile strength.

As is clear from the comparison of Comparative Example IV-9 with Example IV-8; and the comparison of Comparative Example IV-10 with Example IV-9, when PPG is used, the strength of the polyurethane foams is remarkably increased since urea is added in the amount within the range specified above.

As apparent from the comparison of Example IV-10 with Comparative Example IV-11, when PTMG is used, a high strength can be imparted to a formed article without using urea, and the strength of the polyurethane foams is also increased since urea is added in the amount within the range specified above, though the increase of strength is not so remarkable as in the case of using PPG.

With regard to isocyanate index of 100, as apparent from the comparison of Example IV-4 with Comparative Examples IV-2 and IV-5, when PPG is used, the initial strength of the polyurethane foams is increased due to the addition of urea in an amount within the range specified above, and the polyurethane foams can be demolded.

Further, as apparent from the comparison of Example IV-12 with Comparative Example IV-13, when the polymer-polyol is used, the initial strength is increased due to the addition of urea, and the polyurethane foams can be demolded.

With regard to isocyanate index of 90, when the isocyanate index is adjusted to 90, a polyurethane foam can be easily demolded since the polyurethane foam has a high initial strength. As apparent from the comparison of Example IV-2 with Comparative Examples IV-1 and IV-4; and the comparison of Example IV-11 with Comparative Example IV-12, the initial strength of the polyurethane foams is further increased due to the addition of urea.

Furthermore, when the examination is carried out by changing the amount of urea in the system where PPG is used but no PTMG is used and isocyanate index is 100, as is clear from the results of the comparison of Examples IV-1, IV-4 and IV-7, it is found that the highest tensile strength is imparted to a formed article when the urea is used in the amount of 0.6 parts by weight.

As is clear from the results of Comparative Examples IV-7 and IV-8, when water is not added, no effect obtained by the addition of urea in an amount within the range specified above is found at all. On the other hand, as is clear from the results of the comparison of Examples IV-1, IV-4 and IV-7 with Comparative Examples IV-2 and IV-5, when water is added, the effect obtained by the addition of urea in the above specified amount is remarkable because the polyurethane foam can be demolded.

As many apparently widely different embodiments of the invention may be made without departing from the spirit and scope thereof, it is to be understood that the invention is not limited to the specific embodiments thereof except as defined in the appended claims.

What is claimed is:

1. A polyurethane foam prepared by reacting a polyol composition comprising a polyol component containing a polyoxypropylene polyol, urea, a tertiary amine as a catalyst and water with a polyisocyanate compound, wherein the amount of the urea is 0.1 to 0.9 parts by weight based on 100 parts by weight of the polyol component, and said polyoxypropylene polyol comprises:

(A) a polyoxypropylene polyol having an unsaturation degree of not more than 0.06 meq/g, a starting material of which being a compound having two hydroxyl groups, and (B) a polyoxypropylene polyol, a starting material of which being a compound having not less than three hydroxyl groups, and the weight ratio of the polyoxypropylene polyol (A)/the polyoxypropylene polyol (B) is not less than 4.

2. The polyurethane foam according to claim 1, wherein the content of said polyoxypropylene polyol in the polyol component is not less than 50% by weight.

3. The polyurethane foam according to claim 1, wherein the density of the polyurethane foam is 0.2 to 1.0 g/cm$^3$.

4. A process for preparing a polyurethane foam comprising the step of:

reacting a polyol composition comprising a polyol component containing a polyoxypropylene polyol, urea, a tertiary amine as a catalyst and water with a polyisocyanate compound, wherein the amount of the urea is 0.1 to 0.9 parts by weight based on 100 parts by weight of the polyol component, and said polyoxypropylene polyol comprises:

(A) a polyoxypropylene polyol having an unsaturation degree of not more than 0.06 meq/g, a starting material of which being a compound having two hydroxyl groups, and (B) a polyoxypropylene polyol, a starting material of which being a compound having not less than three hydroxyl groups, and the weight ratio of the polyoxypropylene polyol (A)/the polyoxypropylene polyol (B) is not less than 4.

5. The process according to claim 4, wherein the content of said polyoxypropylene polyol in the polyol component is not less than 50% by weight.

6. The process according to claim 4, wherein said polyisocyanate compound is a mixture comprising methylenediphenyl diisocyanate and a modified compound of methylenediphenyl diisocyanate and a polyol, or a mixture comprising methylenediphenyl diisocyanate, the modified compound and a carbodiimide-modified compound.

7. The process according to claim 4, wherein the ratio of the polyol component to the polyisocyanate compound is adjusted so that the ratio satisfies the isocyanate index of 80 to 110.

8. A shoe sole made of a polyurethane foam prepared by reacting a polyol composition comprising a polyol component containing a polyoxypropylene polyol urea, a tertiary amine as a catalyst and water with a polyisocyanate compound, wherein the amount of the urea is 0.1 to 0.9 parts by weight based on 100 parts by weight of the polyol component, and said polyoxypropylene polyol comprises:

(A) a polyoxypropylene polyol having an unsaturation degree of not more than 0.06 meq/g, a starting material of which being a compound having two hydroxyl groups, and (B) a polyoxypropylene polyol, a starting material of which being a compound having not less than three hydroxyl groups, and the weight ratio of the polyoxypropylene polyol (A)/the polyoxypropylene polyol (B) is not less than 4.

9. The shoe sole according to claim 8, wherein the content of said polyoxypropylene polyol in the polyol component is not less than 50% by weight.

10. The shoe sole according to claim 8, wherein the density of the polyurethane foam is 0.2 to 1.0 g/cm$^3$.

* * * * *